United States Patent [19]

Holoyen et al.

[11] 4,148,236

[45] Apr. 10, 1979

[54] METHOD AND A DEVICE FOR CONTROLLING THERMAL STRESSES IN A POWER SAW BLADE

[75] Inventors: Sindre Holøyen, Li, Norway; Clayton D. Mote, Jr., Berkeley, Calif.

[73] Assignee: Norsk Treteknisk Institutt, Oslo, Norway

[21] Appl. No.: 862,958

[22] Filed: Dec. 21, 1977

[30] Foreign Application Priority Data

Dec. 21, 1976 [NO] Norway ............................... 764321

[51] Int. Cl.$^2$ ............................................. B26D 7/10
[52] U.S. Cl. ........................................ 83/74; 83/171; 83/13
[58] Field of Search ................... 83/74, 171, 169, 15, 83/13

[56] References Cited

U.S. PATENT DOCUMENTS

| 1,636,530 | 7/1927 | Nyhus | 83/171 |
| 3,104,576 | 9/1963 | Robinson | 83/171 |
| 3,259,004 | 7/1966 | Chisholm | 83/171 |
| 3,808,988 | 5/1974 | Ohloff | 83/169 |

*Primary Examiner*—Donald R. Schran
*Attorney, Agent, or Firm*—Browdy and Neimark

[57] ABSTRACT

A method and a device for controlling thermal stresses in a power saw blade, especially a circular or band saw blade, during its use for any purpose, in order to assure the stability of the saw blade, by continuously measuring the temperature in two or more zones on the saw blade and determining the temperature difference between the zones; comparing the temperature difference(s) so calculated with one or more predetermined, desired temperature difference values; and using the result(s) of said comparison(s) to regulate the supply/-removal of heat to/from one or more of said zones, in order thereby to maintain the/those desired temperature difference(s). The device comprising at least two temperature sensors a temperature comparator and one or more heat generators.

6 Claims, 5 Drawing Figures

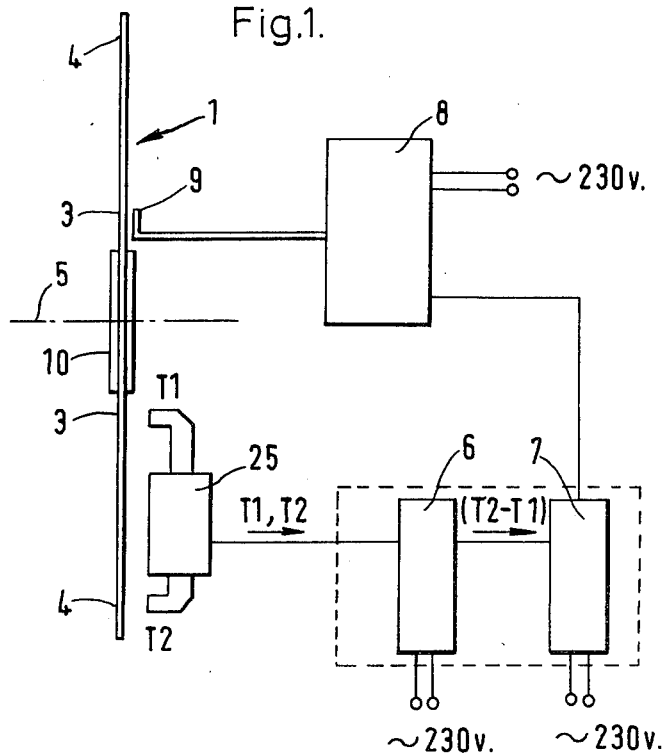
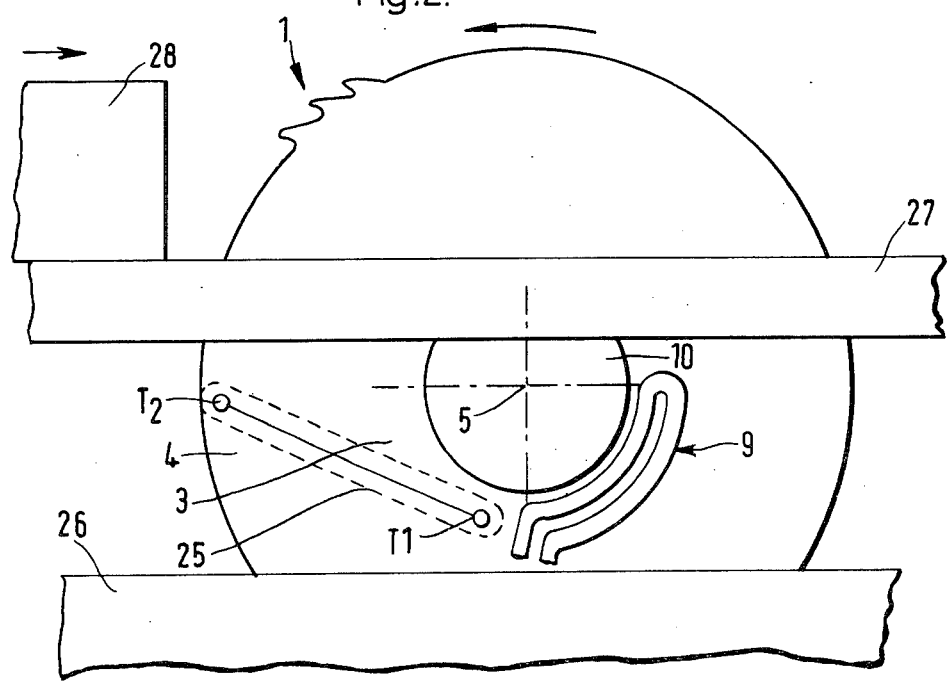

METHOD AND A DEVICE FOR CONTROLLING THERMAL STRESSES IN A POWER SAW BLADE

The present invention relates to a method for controlling thermal stresses in a power saw blade, especially circular and band saw blades, during use for any purpose, in order to ensure the stability of the saw blade, as well as a device for use in carrying out the method. When a power saw is being used, the saw blade becomes heated, causing thermal stresses which in turn can affect the sawing operation.

For example, when sawing wood with a circular saw, heat is conveyed to the circular saw blade from:

1. The cutting operation itself and the removal of saw dust,
2. Friction between the saw blade and the working surfaces,
3. Friction between the saw blade and the blade guide, and
4. The shaft bearings.

The temperature of the saw blade will therefore rise during the first period of use, and the temperature will usually also vary along the blade diameter during the entire period of use. This causes large thermal stresses, which are the main factor determining the stability of the saw blade and its planeness during use. Unsatisfactory cutting precision and wavy cuts, which often occur in practice, can be the direct result of thermal stresses.

Two different methods or techniques are known for controlling the temperature, or, more correctly, thermal stresses, in the saw blade. The first technique is cooling of the saw blade with water, water and oil, or compressed air. The other technique involves packing the saw blade, i.e. heating zones on the blade by means of friction by pressing hemp in between the saw blade and the saw table, thereby generating high temperatures in certain desired zones by means of friction. The latter technique is an excellent way of safeguarding the stability of the saw blade. However, it should be noted that it is difficult, either with packing or with cooling, to determine the effect or efficiency of the technique so utilized unless the saw blade temperature is known.

In order to obtain an approximately correct supply or removal of heat on the saw blade, and thus to obtain good blade stability, it is important that the temperature distribution in the saw blade during use be known. Measurements which were made of the temperature distribution on a circular saw blade during use showed that for different circular saw blades, such as a plane blade and a single-conical blade, temperature curves or a temperature distribution along the radius of the saw blade occured which was constantly repeated for the particular saw blade-type in question, the rotating speeds and feed rates otherwise being the same.

Temperature curve measurements taken on a plane blade with packing, where high temperatures were generated near the clamp pieces, i.e., the discs which attach the saw blade to the shaft, showed that the packing gave an even, stable friction heat. The blade's stress condition was thus satisfactory, allowing it to cut further without risk of rippling cuts and further overheating. This indicates that it would be advantageous to have temperature control in the saw blade located near the heat source, which in this case is comprised of the packing, in order to obtain the correct temperature distribution in the saw blade during use, thus permitting direct control of the stability of the saw blade.

The purpose of the present invention, therefore, is to provide a method for controlling thermal stresses in a power saw blade, especially circular and band saw blades, when it is being used for any purpose, in order to ensure the stability of the saw blade, and this purpose is achieved through the method whose features are disclosed in the main claim.

According to the invention, control of thermal stresses is obtained by continuously measuring the temperature in two or more zones on the saw blade, with continuous calculation of the temperature difference between the zones. Further, the calculated temperature difference(s) are compared to one or more predetermined, desired temperature differences between said zones, and the comparative result or results are subsequently used to regulate the supply or removal of heat in one or more of said zones in order thereby to maintain the desired temperature difference(s). In this way, the most favourable temperature distribution in the saw blade can be maintained under various power requirements or loading, such as, for example, different feed rates.

It is also the purpose of the invention to provide a device for use in carrying out the method, the device being characterized by the features in the coordinate claim and subclaims.

The device according to the invention comprises a temperature sensor arranged in a zone on the saw blade near the toothed sector and at least one temperature sensor arranged in a zone or zones within said first zone; a comparator for comparing the measured temperature difference(s) with the predetermined, desired temperature difference(s); and one or more heat generators, regulated by the result or results of the comparison from the comparator, for controlled supply or removal of heat to one or more of said zones.

The invention will be further explained in the following by means of an embodiment example and with reference to the accompanying drawings, where FIG. 1 is a schematic diagram of the device for controlling thermal stresses in a circular saw blade, FIG. 2 is a side view of the circular saw blade in the saw, the blade having been provided with respective means for measuring the temperatures in two zones on the blade and for heating one of the zones.

Figure 3:
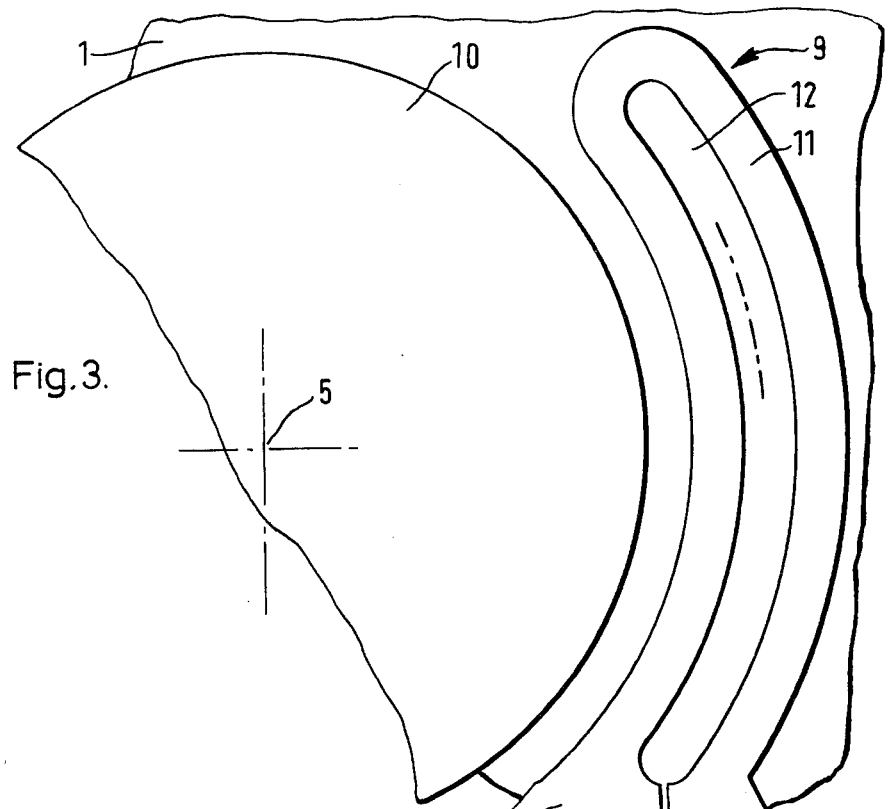
FIG. 3 shows a special embodiment of a high-frequency coil which is used to heat a saw blade zone.

A prototype of the temperature control system based on the present invention is shown schematically on FIG. 1. The system itself is based on results from previous temperature investigations which showed that the temperature distribution in a circular saw blade during use is symmetric about the center of blade. The device for temperature control on the saw blade 1 is a closed circuit with feed back and comprises a temperature sensor for each of two zones 3, 4 on the saw blade having an axis of rotation 5. The temperature sensors in the example shown are an IR detector (=infrared radiation), from which the signals which represent the temperature in zone 3 and zone 4, respectively, are alternately sent to a temperature instrument 6 which registers the measured temperatures $T_1$ and $T_2$ for said zones 3, 4 and calculates the temperature difference (i.e., $T_2-T_1$). A signal representing this temperature difference is relayed to a regulator 7 which contains a comparator a potetiometer for setting a threshold value and a switch for in/out coupling of an inductive high-frequency generator 8 which by means of a coil 9 generates heat in saw blade zone 3.

The saw blade temperature is thus measured in two zones, 3, 4 on the saw blade, zone 3 being near the clamping mechanism 10 (see FIG. 2) which locks the blade 1 onto the saw shaft (not shown), and zone 4 being near the periphery of the saw blade 1. High-frequency induction heating is utilized in zone 3 for maintaining a predetermined, desired temperature difference between zones 3, 4. If the temperature deviates from the predetermined, desired temperature difference, the high-frequency generator 8 is coupled in or out, depending on whether the deviation is greater or less than the desired temperature difference.

The temperature control system as shown on FIG. 1, can be subdivided into three natural areas, i.e., 1. the inductive heating with the high-frequency generator 8 and coil 9,
2. the temperature measurement on the saw blade during use, and
3. the control algorithm which decides whether heat shall be conveyed to the saw blade 1 or not.

When building and testing the prototype of the device of the invention, a 1.2-Hz, 4-kW high-frequency generator, which happened to be on hand, was used. Both the power and frequency of this generator are unnecessarily high for the present purpose, and a smaller type could well be used. The location and shape of the induction coil 9, as shown on FIGS. 2 and 3, were determined by theoretical studies and practical experiments. As seen on FIG. 2, the induction coil 9 is placed relatively near the saw blade clamping mechanism 10, i.e., in the inner zone 3 as shown on FIG. 1, where experience has shown that a controlled heat supply is desirable for maintaining optimum stability in the saw blade during use. The high-frequency coil 9, as shown on FIG. 3, is formed from a 3 mm thick flat copper plate which is punched out to have an arc-shaped portion 11 with an arc-shaped slot 12. Both the slot and the plate material on each side of the slot are 1 cm wide, and the radius to the centerline of the slot 12 is 91 mm. There is a slit 13 at one end of the slot 12, so that the plate is made to form a circuit, i.e., a coil winding. The two separate ends 14, 15 of the plate forming the coil 9 are coupled to the high-frequency generator 8 as shown on FIG. 1.

To register the temperatures in the zones 3, 4 of the saw blade 1, a radiation thermometer was built for the prototype, constructed on the basis of a sensor called a "pyro-electric detector" made by the firm Molectron in Sunnyvale, Calif. The pyro-electric crystal in the detector provides an output signal I which is proportional to the velocity of the temperature change, according to the following formula:

$$I = P(T)A(dT/dt),$$

,ps where

I = sensor current strength,
P (T) = temperature coefficient,
A = area of the sensor,
T = temperature, and
t = time.

When IR radiation from a zone on the saw blade is focused on the sensor, its temperature rises and it sends out electric current owing to the spontaneous alteration in its electrical polarization. Thus, when the IR sensor is subjected to IR radiation for short intervals periodically, a pulsating current is obtained in the circuit to which the sensor is coupled, as shown on the curve on FIG. 5, where the area below the top of the curves in zone 4 and zone 3, respectively, i.e. the outer and inner zones on the saw blade 1, is proportional to the temperature in the saw blade zones.

Figure 4:
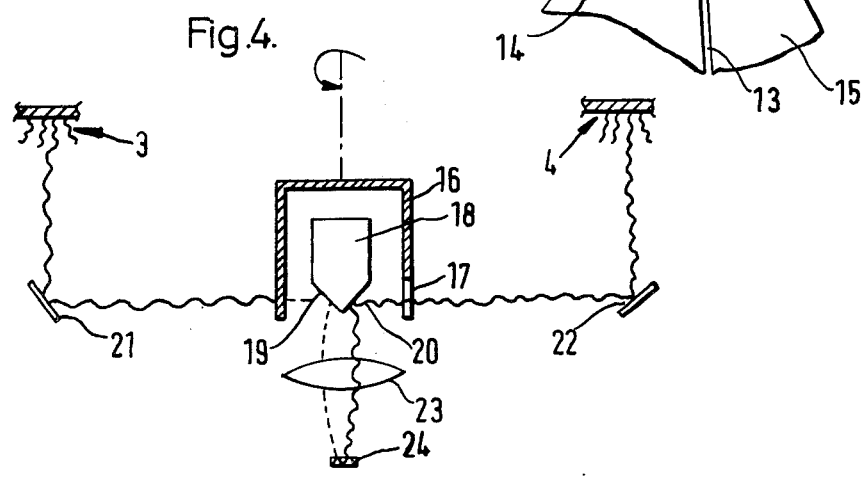
FIG. 4 shows a special device for measuring temperature, i.e., heat radiation from two zones in the saw blade, by means of a temperature sensor which in this case is a pyroelectric sensor.
Figure 5:
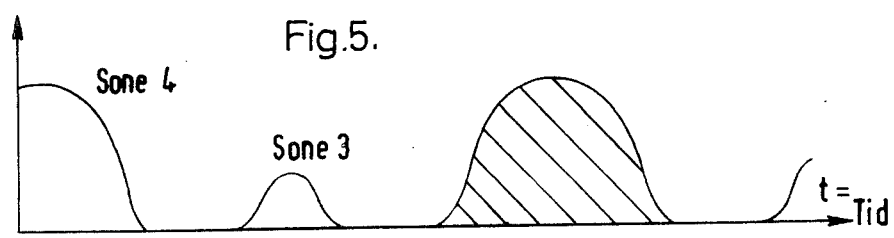
FIG. 5 is a curve showing the temperature measured in two saw blade zones by means of the device of FIG. 4.

The pulsating current as shown on FIG. 5 and the pulse frequency are obtained by means of a "chopper" i.e., a circuit breaker which consists of a cup-shaped body 16 having a slot 17, as shown on FIG. 4, said cup-shaped body 16 being positioned above the prism 18 and turned by a motor (not shown) at a speed of 33 revolutions per second. The prism 18, having two prism surfaces 19, 20 which are at right angles to one another, is positioned such that heat radiation from the saw blade zones 3 and 4, which is reflected by mirrors 21, 22 to said prism surfaces 19, 20, is further reflected via the prism surfaces through an IR lense 23 a pyro-electric sensor 24.

As the cup-formed body 16, rotates, heat radiation from zones 3 and 4, via the mirrors 21, 22 to the prism surfaces 19, 20, will alternately be passed through via the slot 17 or will be blocked, such that the pyro-electric sensor 24 receives heat radiation every other time from zone 3 or zone 4, respectively, for each revolution of the cup-shaped body 16.

The sensor used is a P1-11 Modul detector/amplifier with adjustable signal amplitude and a choice of band width. The specifications for the P1-11 are given below:

Wave length: 0.001–1000 $\mu$m
Diameter for sensor element: 1 mm
Band width: >10 kHz
Temperature range: −20° C. to +85° C.
Temperature coefficient: <0.2%/° C.
Signal impedance: >$10^{13}$
Nominal sensitivity: 200 mV/° C.

The device described above constitutes the detector 25 shown on FIG. 1. The detector need not be limited to the embodiment described, but could also be made of two separate sensors or temperature sensors which are coupled in a practical manner to the temperature instrument 6 for continuously measuring the heat radiation from zones 3 and 4, determining the temperature difference, and relaying the signal showing the temperature difference to the comparator 7, as discussed previously. The selection of the zones for temperature measurement on the saw blade can of course also deviate from those shown on the drawing, and additional zones can also be utilized for determining the difference in temperature between the zones, which are then compared with predetermined, desired temperature difference values for the zones in question.

The control algorithm, point (3) of the subdivision of the temperature control system into three areas outlined previously, uses the temperature difference between the two zones on the saw blade as a control variable. On the present regulator 7 (FIG. 1), the temperature difference can be regulated (threshold value) within the range −40° C. to +40° C.

By comparing said temperature difference with the set threshold value, the control algorithm decides whether or not heat should be supplied to the saw blade, and thus determines whether the high-frequency generator 8 should be coupled in or not.

The temperature difference $T_2-T_1$ between zones 4 and 3 is maintained in that the inductive high-frequency generator 8 is turned off and on. The active control in the system described in one-sided in that it does not comprise any device for controlled cooling of the saw blade 1. However, building in a possibility for regulated cooling in the control system will not in principal alter this. In most cases, the forced heat convection on the saw blade, which is caused by its rotation, provides the necessary cooling of the blade.

The temperature control system oscillates in the neighborhood of the set threshold value $T_2-T_1$ both in the heating phase and in the cooling phase. The maximum temperature change during tests with the above prototype was c. 4°–6° C. per second in the heating phase and c. 0.5° C. per second in the cooling phase. The characteristic time for heating and cooling is therefore sufficiently long, so that stability problems do not occur in the temperature control system.

As a temperature sensor for measuring the temperature in the saw blade 1, a "temperature profile sweep line scanner," which covers the entire width of the blade can be used. The temperature at desired single points or zones can be extracted from this and the signals treated in the same way as described above.

On FIG. 2, the saw blade 1 is shown in connection with a machine frame 26 and the feed table 27 for the saw, on which a piece of wood 28 is guided toward the saw blade 1. The IR detector 25 is placed beneath the feed table 27, somewhat lower than the horizontal plane through the axis of rotation 5 for the saw blade 1. The high-frequency coil 9 is positioned similarly.

The temperature control system for a circular saw blade, as described above, can also be used to advantage for a band saw blade, where it is also important for the saw blade's stability that the calculated preferable temperature ratio between the saw blade zones be maintained in order to prevent the occurrence of undesirable temperature gradients crosswise on the band saw blade and to achieve better cutting quality, and greater capacity.

Having described our invention, we claim:

1. A method for controlling thermal stresses in a power saw blade, especially a circular or band saw blade, during its use, in order to assure the stability of the saw blade, characterized by continuously measuring the temperature in at least two zones on the saw blade and determining the temperature difference between the zones; comparing the temperature difference(s) so calculated with predetermined, desired temperature difference values; and using the result(s) of said comparison(s) to regulate the transfer of heat to modify the temperature of at least one of said zones, in order thereby to maintain the desired temperature difference(s).

2. A device for controlling thermal stresses in a power saw blade comprising a saw blade having teeth at an edge thereof, a temperature sensor disposed in a zone on the saw blade near the teeth of the blade and at least one other temperature sensor disposed in a zone or zones spaced from the teeth and said first zone; a comparator for comparing the measured temperature difference(s) with the predetermined, desired temperature difference(s); and one or more heat generators controlled by the result(s) of the comparison(s) from the comparator for controlled heat supply to one or more of the zones.

3. A device according to claim 2, characterized in that the temperature sensors and heat generators are placed on a line which corresponds to a standing diameter for the rotating circular saw blade, and in that the heat generators are placed on the other side of the hub of the circular saw blade relative to the temperature sensors.

4. A device according to claim 3, characterized in that said line is parallel with the direction of feed for the saw.

5. A device according to claim 2, characterized in that the temperature sensors are of a known type which measures infrared radiation, and in that the heat generator is a known per se induction heat generator.

6. A device according to claim 5, characterized by an IR-detector to which heat radiation from the two zones is reflected as pulses one at a time via a mirror for each zone to a prism placed between the two mirrors, and thence to the IR detector, a rotating, cup-shaped cover with a slot opening in one side being provided surrounding the prism, said cover alternately admitting and blocking heat radiation from one and then the other zone.

* * * * *